United States Patent
Kamijo et al.

(10) Patent No.: US 7,093,299 B1
(45) Date of Patent: Aug. 15, 2006

(54) SYSTEM FOR AUTHENTICATING DIGITAL DATA

(75) Inventors: Koichi Kamijo, Yokohama (JP); Norishige Morimoto, Tokyo-to (JP); Akio Koide, Yokohama (JP); Tohru Sakakura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/459,287

(22) Filed: Dec. 17, 1999

(30) Foreign Application Priority Data

Dec. 28, 1998 (JP) ............................... 10-372355

(51) Int. Cl.
- G06F 7/04 (2006.01)
- G06F 11/00 (2006.01)
- H04L 9/00 (2006.01)

(52) U.S. Cl. ........................... 726/29; 713/168; 714/6
(58) Field of Classification Search ........ 713/176–178, 713/192, 180, 164–165; 380/9, 10, 30, 49; 711/209, 115; 710/13; 714/6, 719; 726/29
See application file for complete search history.

(56) References Cited

U.S. PATENT DOCUMENTS

| | | | |
|---|---|---|---|
| 5,465,300 A * | 11/1995 | Altschuler et al. ............ | 380/30 |
| 5,499,294 A * | 3/1996 | Friedman .................... | 713/179 |
| 5,644,539 A * | 7/1997 | Yamagami et al. ......... | 365/200 |
| 5,949,877 A * | 9/1999 | Traw et al. ................. | 713/171 |
| 6,510,520 B1 * | 1/2003 | Steinberg .................... | 713/192 |

FOREIGN PATENT DOCUMENTS

| | | |
|---|---|---|
| JP | PUPA 09-179951 | 7/1997 |
| JP | PUPA 09-265254 | 10/1997 |

OTHER PUBLICATIONS

Friedman, Gary L. "The Trustworthy Digital Camera: Restoring Credibility To The Photographic Image", published Nov. 1993 by IEEE.*

Schneier, Bruce. Applied Cryptography, Second Edition, 1996 by John Wiley & Sons, Inc.*

* cited by examiner

Primary Examiner—Jacques H. Louis-Jacques
Assistant Examiner—Michael J. Simitoski
(74) Attorney, Agent, or Firm—William A. Kinnaman, Jr.

(57) ABSTRACT

A system for authenticating digital data capable of preventing change or disguise of data by improvement or interchange in case of no confidentiality in the data itself so as to maintain the data. When writing digital data from an input device to a memory and transferring the digital data from the memory to a receiving device, device authentication is performed between the input device and the memory and between the memory and the receiving device respectively. At the same time, when writing digital data to the memory, in the case of implementing on the digital data an electronic signature by a one-way hash function and also reading from the memory and transferring the digital data, the implemented electronic signature is decrypted so as to transfer the digital data after ensuring that it has not been changed since it was recorded. Thus, it is possible to prevent change or disguise of data by improvement or interchange in case of no confidentiality in the data itself so as to maintain the data.

1 Claim, 4 Drawing Sheets

|  |  | 0 | 511 512 | 527 |
|---|---|---|---|---|
| Block 0 | Page 0 | Data area (512Byte) | Redundant section (16Byte) | |
| | Page 1 | | | |
| | : | | | |
| | Page 15 | | | |
| Block 1 | Page 0 | | | |
| | Page 1 | | | |
| | : | | | |
| | Page 15 | | | |
| : | : | : | : | |
| : | : | : | : | |
| : | : | : | : | |
| : | : | : | : | |
| : | : | : | : | |
| Block 999 | Page 0 | | | |
| | Page 1 | | | |
| | : | | | |
| | Page 15 | | | |

Fig. 4

◎ Data area (512Byte)

| Byte | All pages |
|---|---|
| 0 ~ 255 | Data Area − 1 |
| 256 ~ 511 | Data Area − 2 |

◎ Redundant area (16Byte)

| Byte | All pages |
|---|---|
| 512 | Reserved Area |
| 513 | |
| 514 | |
| 515 | |
| 516 | Data Status Area |
| 517 | Block Status Area |
| 518 | Block Address Area − 1 |
| 519 | |
| 520 | ECC Area − 2 |
| 521 | |
| 522 | |
| 523 | Block Address Area − 2 |
| 524 | |
| 525 | ECC Area − 1 |
| 526 | |
| 527 | |

Fig. 5

SYSTEM FOR AUTHENTICATING DIGITAL DATA

BACKGROUND OF THE INVENTION

1. Field of the Invention

The present invention relates to a system for recording digital data for maintenance, namely prevention of tampering or changing of digital data transferred via memory for temporarily storing data from a digital data input device such as a digital camera, particularly to a system capable of preventing changes to a digital photograph for assessment of non-life insurance or for recording work on a building site taken by a digital camera.

2. Description of the Related Art

In recent years, digital data is increasingly used in a number of fields due to rapid proliferation of consumer digital devices such as a digital camera. However, digital data is accompanied by a risk to be used as evidence since there is a danger of contents being changed without leaving a trace. In order for a recipient of data to trust any data, there should be a means for assuring that the data has not been changed since it was acquired.

As a method to prevent tampering or changing of digital data, there are methods such as MAC (Message Authentication Coding) where an electronic signature created by a one-way hash function is transferred being attached to the data. In the case of a digital image, it is also possible to further enhance conformity of the electronic signature with an embedded image by using an electronic watermark in the image (for instance, Japanese Unexamined Patent Publication No. Hei 10-164549).

However, if application to a digital photograph which supposedly needs this technology most of all is considered, it will be inside a camera that an electronic signature is implemented. In that case, a more reliable system is desired since an encryption key stored in the camera is fixed in addition to high load of computation on the camera. Namely, a method which is implementable within constraints of current hardware and capable of ensuring necessary and sufficient integrity of data has been required.

An object of the present invention is to resolve the above-mentioned problem and to provide a system for authenticating digital data capable of preventing change or disguise of data by improvement or interchange in case of no confidentiality in the data itself so as to maintain the data.

SUMMARY OF THE INVENTION

The present invention covers a system for writing digital data entered from an input device to a memory and transferring the digital data written in the memory to a receiving device. In this system, first of all, when writing digital data from the input device to the memory and transferring the digital data from the memory to the receiving device, devices are authenticated between the input device and the memory and between the memory and the receiving device respectively. At the same time, when writing digital data to the memory, in the case of implementing on the digital data an electronic signature by a one-way hash function and also reading from the memory and transferring the digital data, the implemented electronic signature is decrypted so as to transfer the digital data after ensuring that it has not been changed since it was recorded.

In the present invention, first of all, when writing data from an input device for digital data to a memory and transferring the data from the memory to a receiving device, it is possible to authenticate the respective device so as to limit a data transfer route to the receiving device via the memory from the input device of digital data. It is also possible, when recording data in the memory, to prevent any change of data caused by a direct access to the memory by implementing on the data an electronic signature by a one-way hash function, preferably by a built-in central processing unit (CPU). This can prevent change or disguise of data by improvement or interchange in case of no confidentiality in the data itself so as to maintain the data.

BRIEF DESCRIPTION OF THE DRAWINGS

FIG. 4 is a drawing showing an example of a physical format of a CompactFlash memory card.

FIG. 5 is a drawing showing a page model in a CompactFlash memory card.

DESCRIPTION OF THE PREFERRED EMBODIMENTS

Figure 1:
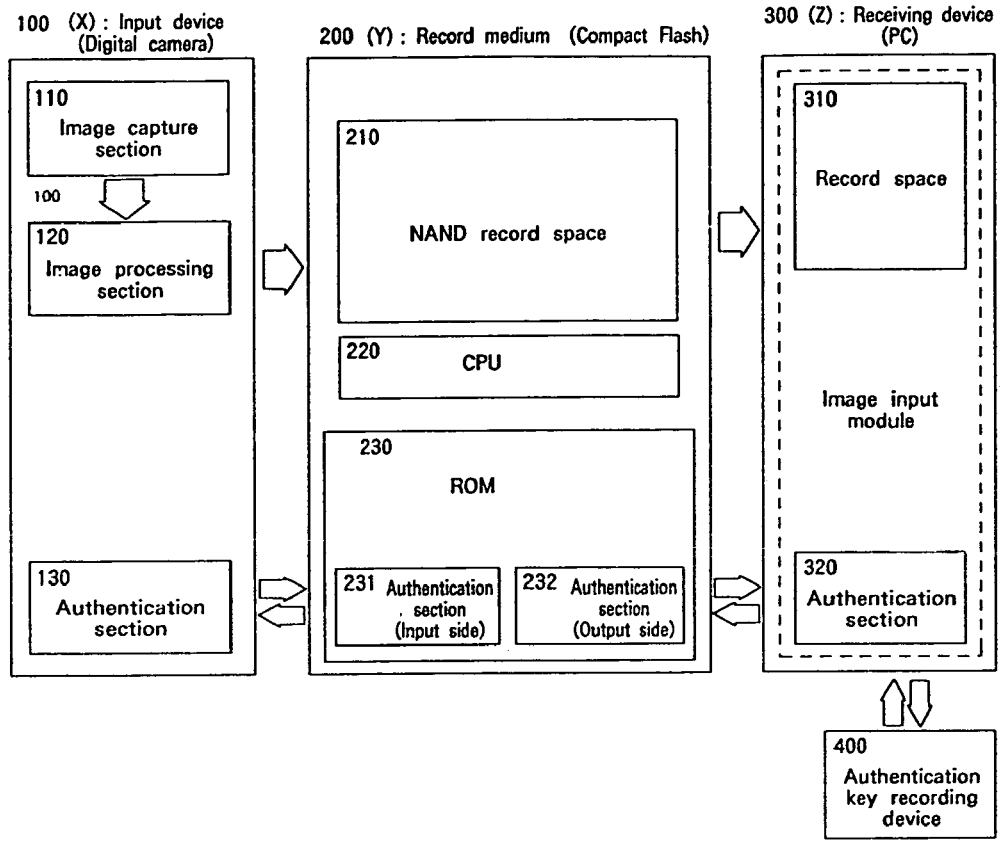
FIG. 1 is a drawing for describing an example of a system for authenticating digital data of the present invention.

FIG. 1 is a drawing for describing an example of a system for authenticating digital data of the present invention. In the example shown in FIG. 1, input device 100 is a digital camera, memory 200 is a CompactFlash memory card, receiving device 300 is a personal computer for managing image data. Memory 200 is not limited to a detachable style and may be a memory built into a camera. Moreover, in the following description, "ordinary data transfer" means data transfer which operates properly even with an unspecified device without authentication. Furthermore, a digital camera with an authentication feature related to the present invention is referred to as SDC (Secured Digital Camera), a memory with an authentication feature related to the present invention as SCF (Secured CompactFlash), and a personal computer with an authentication feature related to the present invention as SPC (Secured Personal Computer). In addition, DC, CF and PC refer to a digital camera, a CompactFlash memory card, and a personal computer in general, respectively.

First, a prerequisite for implementing a system for authenticating digital data of the present invention is described. To begin with, specific and common commands (Request Seed and Send Seed commands) are defined among input device 100, memory 200 and receiving device 300 which are specified. While a general device returns an error to these commands, it results in time-out. Request Seed command is a command which requests the transmission of a seed to a client, and Send Seed command is a command which informs a client that a seed is to be transmitted. Next, between input device (SDC) 100 and memory (SCF) 200 which are specified, they have a specific encryption function Hdc and its key Kdc. Memory 200 also has a certain hash function Hcf and an internal key Kcf. They are stored in read-only memories (ROMs) of their respective devices and do not leak out of the devices. Even in case Hdc or Hcf leaks out, however, confidentiality is maintained.

Next, between memory (SCF) 200 and receiving device (SPC) 300 which are specified, they have a specific mutual encryption function Hpc and its key Kpc. In memory 200, Kpc is stored in NAND record space 210, encrypted by a certain encryption function Ex and its key Kx. Hpc, Ex and Kx are stored in a ROM of SCF. Also in receiving device 300, Kpc is encrypted by a certain encryption function E2pc and its key password. The password is either stored where an owner of SCF cannot access or itself encrypted. It is described in detail later. The functions of the devices in each process are described as follows, referring to FIG. 1.

1. Recording a Digital Image to Memory

In FIG. 1, an image obtained at image capture section 110 is recorded in NAND record space 210 of memory 200 by way of image processing section 120. As for memory 200, when it receives a request for writing data from input device 100, authentication section 231 of memory 200 performs device authentication to authentication section 130 of input device 100 by way of built-in central processing unit (CPU) 220. If authentication is successful, an authentication flag is written when data recording is implemented from image processing section 120 to NAND record space 210. This authentication may also be configured to repeat intermittently even while data transfer continues so as to enhance a security level and so as not to have a device replaced after success of device authentication. Its contents are described later. The following explains an actual process:

1.1. SDC transmits a Request Seed command to CF and requests a certain random number (=R1). In this case, if an error is returned or there is no response, SDC determines that CF is not SCF and performs ordinary data transfer.
1.2. SCF returns R1 to SDC. If an ordinary write command is received before a seed is requested, SCF determines that DC is not SDC and performs ordinary data transfer.
1.3. SDC starts data transfer. CF usually repeats data transfer of one page (=512 bytes) 256 times at the maximum per write command.
1.4. If R1 is returned from CF in (1.2), SDC calculates by the following expression (1) R_Ed which is R1 encrypted by using a key Kdc and returns it to CF. Kdc is a secret key between SDC and SCF.

$$R\_Ed=Hdc(Kdc,R1) \quad (1)$$

1.5. SCF calculates the above expression (1) by using Hdc and Kdc which it has and R1 which was sent to DC, so as to check if R_Ed matches what came from DC. If R_Ed does not match it, it is determined that DC is not SDC, and data transfer for the write command this time becomes an ordinary data transfer including that page.

2. Data Protection in Memory

If R_Ed matches in the above (1.5), SCF further attaches, before next authentication is performed, an authentication mark (flag) generated at the CPU to an image to be recorded to a receiving page and implements an electronic signature to record it in NAND record space 210. If there is no authentication, it records it without attaching any authentication mark. CF has a redundant area of 16 bytes per page not to be calculated by ECC, and 4 bytes of the area is a reserved area in which the flag can be written. Detailed configuration of a CompactFlash memory card is described later. While an authentication mark is acquired by taking hash of the sent data, if it is costly to take hash for all of the data, data to be hashed may also be determined by cipher. In this case, although there should be concern about security because hash is not taken from the entire data, security is considered to be sufficiently maintained since data from DC is normally compressed by JPEG and changing data itself by swapping by the portion (1 byte for instance) is very difficult. Here, for calculation of hash, Kcf which is a unique key to each SCF built into a ROM of SCF is used. As long as Kcf is confidential, hash function Hcf itself does not need to be confidential.

When transferring data to receiving device 300, memory 200 decrypts with a built-in CPU an electronic signature attached to an image by using data authentication algorithm Hcf and nonpublic key Kcf, and returns a correct answer to authentication between SCF and PC mentioned later after ensuring that the image has not been changed since it was recorded. In case change is detected, it returns an error to authentication between SCF and PC.

3. Data Transfer from a Memory to a Receiving Device:

Any data recorded in NAND record space 210 of memory 200 is transferred to record space 310 of receiving device 300. On this occasion, device authentication is performed between authentication section 232 of memory 200 and authentication section 320 of receiving device 300, and only if authentication is successful, data transfer is implemented from NAND record space 210 to record space 310. When reading data from memory 200, receiving device 300 performs authentication to authentication section 232 of memory 200 based on mutually common encryption function Hpc and nonpublic key Kpc specified by receiving device 300 so as to verify that it is the normal receiving device 300. In addition, as mentioned above, when transferring data to receiving device 300, memory 200 ensures with a built-in CPU that the image has not been changed since it was recorded by using data authentication algorithm Hcf and nonpublic key Kcf, and then transfers to receiving device 300 the data indicating that it is already ensured. It is possible to verify that the data is the data which came through a limited route from predetermined input device 100 based on authentication of memory 200 and information of "confirmation of no change" communicated from memory 200. The following shows a concrete process:

3.1. SPC issues a Send Seed command to CF and informs that a certain random number (=R2) is to be transmitted.
3.2. SPC returns R2 to CF.
3.3. SPC starts reading data. CF usually repeats data transfer of one page (=512 bytes) 256 times at the maximum per read command.
3.4. SCF first checks by using Hcf and Kcf whether the data to be read by PC is correctly flagged. If not correctly flagged, it determines that the data is not specified and returns an error to authentication for a read command this time.
3.5. If it is correctly flagged, SCF calculates the following expression (2) for the transmitted R2 and returns R_Ep to PC. Kpc is a secret key between SCF and SPC.

$$R\_Ep=Hpc(Kpc,R2) \quad (2)$$

Figure 2:
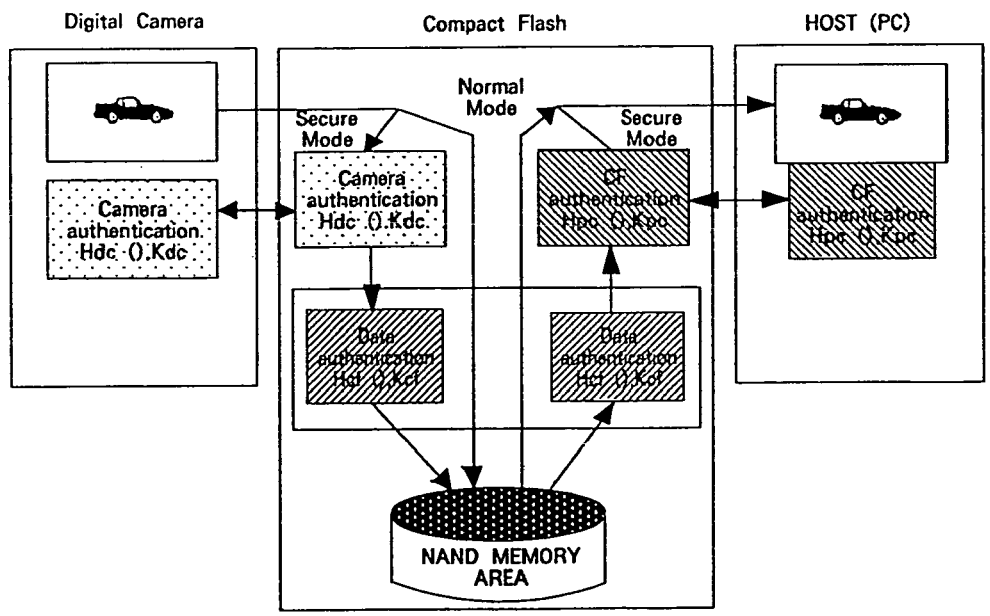
FIG. 2 is a drawing showing the concept of authentication and data flow in the present invention.

3.6. SPC calculates the above expression (2) by using Hpc and Kpc which it has and R2 which was sent to CF, so as to check if the calculated R_Ep matches what came from SCF. If they do not match, it determines that CF or the data to read is not what is specified.
3.7. If a result of calculating R_Ep matches what came from CF, to the read data to be covered, SPC sends a seed and performs authentication at least once each time a read command is sent until all has been read, and only in the case that authentication was correctly performed to all the pages, it determines that the data came from SDC by way of SCF without being changed. By this series of operations, SPC can verify a source of the received data and whether or not it has been changed. FIG. 2 shows the concept of the above-mentioned authentication and data flow from SDC to SPC via SCF.

Figure 3:
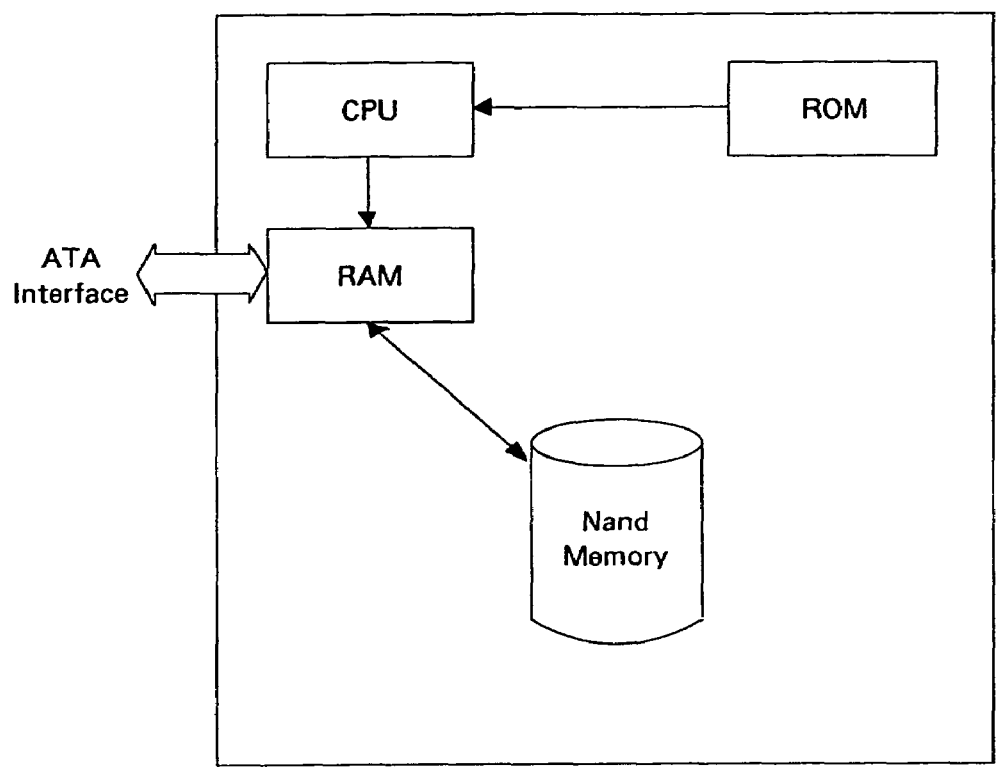
FIG. 3 is a drawing showing an example of an internal structure of a CompactFlash memory card.

Next, a structure of a CompactFlash memory card which is suitably usable in the above-mentioned system for authenticating digital data of the present invention is described. A CompactFlash memory card is a small nonvolatile memory released from SanDisk in 1994, PCMCIA-ATA compatible and electrically and mechanically usable as a PCMCIA card of Type II. It has capacity of 4 MB, 8 MB, 16 MB and so on and has a wide range of uses including storage of a JPEG image (50 KB to 100 KB) taken by a digital camera. A major characteristic of a CompactFlash memory card is that it has a built-in CPU in spite of its small size and bulk. FIG. 3 shows an example of an internal structure of a CompactFlash memory card, FIG. 4 an example of physical format specifications (8 MB) and FIG. 5 an example of a page model. In the present invention, flags are written to a Reserved Area which is a redundant area shown in FIG. 5.

The above concluded description of the main part of a system for authenticating digital data of the present invention. Next, with regard to the other alternatives of operation, examples of operation by a public key, multiplexing of an authentication sector and encryption of Kpc in a PC are described. First, 4. Operation by a Public Key:

In an authentication facility between SDC and SCF, it is possible to utilize a public key system so as to make it more difficult to write to SCF any image changed by "disguise" of a camera. This can be attained by providing the camera side with a secret key for encrypting data for challenge and the SCF side with a public key for authenticating a reply from the camera.

5. Multiplexing of an Authentication Sector:

In device authentication, a subject device (SCF in the case of SDC and SCF, SPC in the case of SCF and SPC) sends data for challenge to the other party's device, and concludes it by verifying with cipher on hand the data translated by predetermined encryption and returned. If a device authentication process and following data transfer are separated, there is a danger that "disguise" of a device may occur by switching to a next input device as soon as authentication is completed. To prevent this, it is arranged so that authentication data, mixed with transfer data, is continuously sent from the input device. A rule for mixing authentication data is to generate it from a reply after encrypting challenge data (R_Ed, R_Ep), and the other party's device is authenticated by both direct transfer of authentication data and a rule for transferring that data.

6. An Example of Encryption of Kpc in a PC:

First, the restrictive conditions in this configuration are as follows.

1. For any attack on contents of a ROM in SDC and SCF, it is tamper resistant in which a code of a ROM cannot be analyzed from outside and contents of a ROM cannot be analyzed even if it is decomposed. Accordingly, the keys in it (Kdc, Kcf and Kx) cannot be attacked, either.
2. Since Kpc, an encryption key for uploading in SPC is managed by SPC administrator and encrypted, it cannot be estimated by an owner of SCF. In case there is a possibility that an owner of SCF may decrypt an uploaded program of a PC and estimate Kpc in that PC, the following measures may be taken.
   a. When installing Kpc:
      When installing Kpc, a PC administrator calculates Kpc' which is Kpc encrypted by the following expression (3) and stores it in a PC.

$$Kpc'=E2pc(\text{password},Kpc) \quad (3)$$

Here, E2 pc is an encryption function for encrypting Kpc, and the password is one that only a PC administrator can know. It also stores in a PC a password' which is the password hashed by the following expression (4). In this case, the password itself is not stored.

$$\text{Password}'=Hpasw(\text{password}) \quad (4)$$

Here, Hpasw is a one-way hash function.

b. When authenticating between SCF and SPC

An SPC administrator enters a password. An uploaded program of SPC calculates expression (4) from the entered password, and if the calculated value matches the stored password', calculates Kpc from the following expression (5) and use it for authentication.

$$Kpc=D2pc(\text{password},Kpc') \quad (5)$$

Here, D2pc is a decoding function for E2pc, and the following expression (6) holds for arbitrary values x, y.

$$x=D2pc(y,E2pc(y,x)) \quad (6)$$

In this method, even if a malicious person successfully locates Kpc', a password', E2pc, D2pc and Hpasw, it is impossible to estimate Kpc from there.

The above-mentioned advantages of the present invention are summarized as follows.

1. Since device authentication is performed between SDC and SCF and between SCF and SPC respectively, it is possible to limit a data transfer route from an input device to a receiving device.
2. Data transfer between SDC and SCF and between SCF and SPC are intermittently authenticated by multiplexing an authentication sector to data so as to allow prevention of substitution of an input device without authentication after successful authentication of a device.
3. When recording data in a memory area of SCF, since a signature is implemented by a hash function using a secret key in a ROM of SCF, it can prevent NAND record space 210 from being decomposed and replaced by any changed data.
4. Since authentication keys with SDC and SPC (Kdc and Kpc) are encrypted by a secret key in a ROM (Kx), they cannot be stolen even if NAND record space 210 of SCF is decomposed.
5. Even if device authentication was not performed or failed, data can be recorded in NAND record space 210 and read out in the same manner as an ordinary CF. However, it is not authenticated.
6. Since the system of the present invention can be implemented by modification of a program built into existing hardware, it does not put much of a burden upon a camera manufacturer so that it is expected to spread in the market as a de facto standard.

As it is clear from the above description, the present invention can assure maintenance of data of an input device and a receiving device of digital data in an inexpensive and effective manner so as to allow a digital photograph to become admissible evidence. In addition, since introduction of this technology can be materialized by modification of a program built into existing hardware, it does not put much of a burden upon a camera manufacturer so that it is expected to spread in the market as a de facto standard. It can also promote digitization of companies and the like which withhold from digitization in terms of safety of transfer data.

What is claimed is:

1. A memory device for authenticating digital data in a system for writing digital data entered from an input device to the memory device and transferring the digital data written in the memory device to a receiving device, said memory device comprising:

means for generating an electronic signature on digital data when writing the digital data from the input device;

means for storing the digital data and the electronic signature; and means for authenticating the electronic signature on the digital data when transferring the digital data to the receiving device, wherein said memory device is a flash memory and stores said electronic signature on said digital data in a redundant area not to be calculated by an ECC of each page in a memory area.

* * * * *